(12) United States Patent
Chapman

(10) Patent No.: US 6,708,720 B2
(45) Date of Patent: Mar. 23, 2004

(54) VALVE ACCESSORY

(75) Inventor: Roger C. Chapman, Fareham (GB)

(73) Assignee: Kinetrol Limited, Farnham (GB)

( * ) Notice: Subject to any disclaimer, the term of this patent is extended or adjusted under 35 U.S.C. 154(b) by 8 days.

(21) Appl. No.: 10/262,657

(22) Filed: Oct. 2, 2002

(65) Prior Publication Data
US 2003/0075704 A1 Apr. 24, 2003

(30) Foreign Application Priority Data
Oct. 2, 2001 (GB) .............................. 0123662

(51) Int. Cl.[7] .............................................. F16K 31/00
(52) U.S. Cl. ....................................... 137/269; 251/292
(58) Field of Search ............................ 251/292, 293; 137/269, 271

(56) References Cited

U.S. PATENT DOCUMENTS

| 4,719,939 | A | * | 1/1988 | Killian ........................ 251/292 |
| 4,887,634 | A | * | 12/1989 | Killian ........................ 251/292 |
| 5,240,030 | A | * | 8/1993 | Wang .......................... 137/269 |
| 5,564,461 | A | * | 10/1996 | Raymond et al. ........... 251/292 |
| 5,887,608 | A | | 3/1999 | Bordelon et al. |
| 5,954,088 | A | * | 9/1999 | Huang ......................... 251/292 |
| 6,135,417 | A | * | 10/2000 | Wadsworth et al. ........ 251/292 |

FOREIGN PATENT DOCUMENTS

| WO | WO 01/07811 | 2/2001 |

* cited by examiner

*Primary Examiner*—John Bastianelli
(74) *Attorney, Agent, or Firm*—Larson & Taylor PLC

(57) ABSTRACT

A valve actuator adaptor attaches a rotary valve whose mounting is in accordance with ISO 5211/DIN 3337 to a rotary actuator whose mounting is not in accordance with ISO 5211/DIN 3337. The adaptor has first and second mounting surfaces to which the valve head and the actuator are respectively secured and a coupling link extends through the body of the adaptor to interconnect the actuator drive shaft and the valve stem. The adaptor has holes which extend from the first mounting surface to an exposed surface intermediate along the axial length of the actuator. That exposed surface is formed by recesses in the body of the actuator and by partial flanges. Screws or bolts then pass through those holes to the adapter to the valve head, the exposed surface having recesses therein, which recesses are shaped to receive the heads of the screws or bolts, or nuts on the bolts, to prevent them rotating.

15 Claims, 7 Drawing Sheets

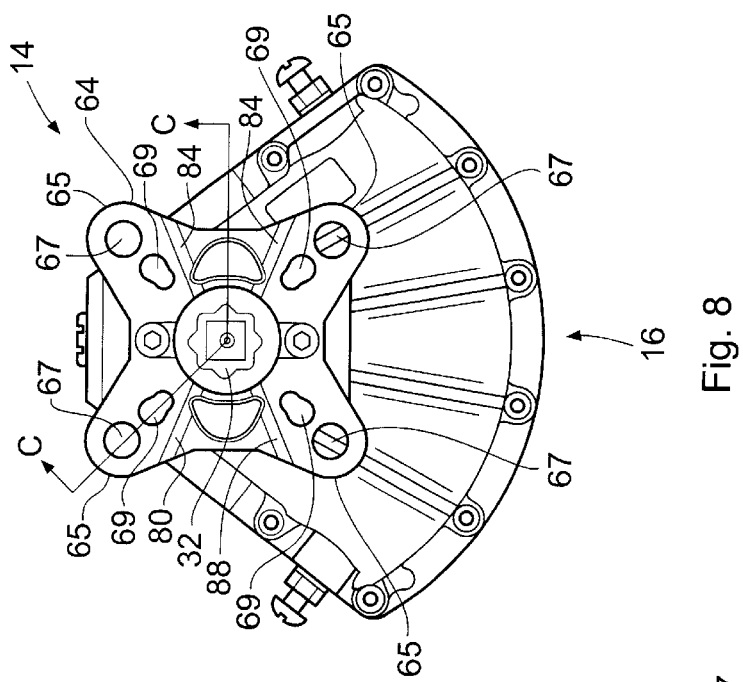
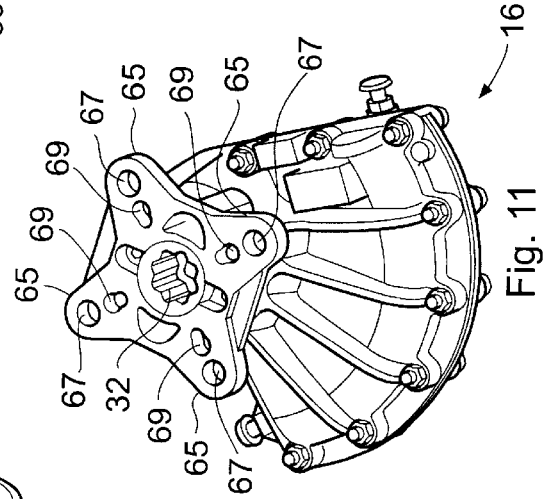
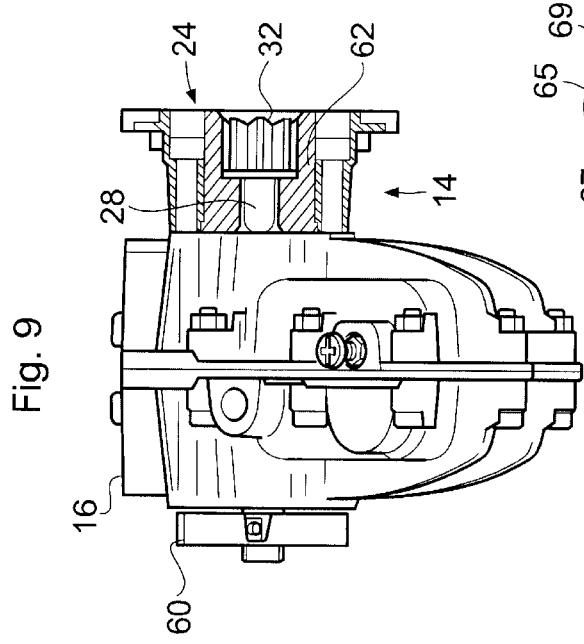
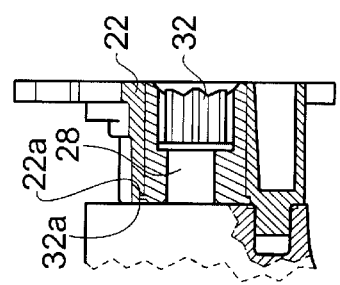

VALVE ACCESSORY

BACKGROUND OF THE INVENTION

1. Field of the Invention

The present invention relates to a valve accessory, and in particular to an adaptor for a valve actuator.

2. Summary of the Prior Art

Valves, particularly industrial valves, are usually opened and closed by valve actuators. Typically, a valve has a rotational control stem which opens the valve mechanism when it is rotated one way and closes the valve when rotated the other. By convention, the direction of opening is usually anticlockwise looking along the control stem towards the valve mechanism.

Rotation of the control stem is carried out by the actuator, usually in response to a control signal. The actuator has a rotational drive and this engages with the control stem to rotate the control stem. The actuator housing is usually attached to the valve itself, at a part other than the control stem, in order more efficiently to generate torque to rotate the control stem with respect to the rest of the valve.

The present invention is particularly concerned with part turn actuators in which the rotational drive of the actuator has a limit of rotation of less than a complete revolution, i.e. less that 360°.

For satisfactory operation and to minimise leakage, valves are manufactured with small dimensional tolerances. This has led to some of their dimensions being standardized. This is the case in terms of the dimensions of the interface between a valve and a part turn actuator. The relevant standards are ISO 5211 (reference number ISO 5211:2001 (E), published Feb. 15, 2001) and DIN 3337 (published September 1985). The contents of these publications are incorporated herein by reference. Where relevant in this specification, they will be referred to together as ISO 5211/DIN 3337, or separately, as appropriate. Devices which are described as non-ISO 5211/DIN 3337 are devices which do not conform either to ISO 5211 or to DIN 3337.

To be directly attachable to a valve of standard dimensions, an actuator must also have standard dimensions. An advantage of the standardized valve/actuator assembly is that a bracket and coupling usually need not be used since the actuator can be directly mounted onto the valve. Of course, manufacture of an entire actuator in accordance with international standardized dimensions places restrictions on the actuator. Furthermore, for an existing actuator design standardisation often requires extensive redesign of the whole actuator which is expensive. Still further, the adoption of such standards can make existing, otherwise satisfactory actuators and actuator designs obsolete.

SUMMARY OF THE INVENTION

In a general aspect, the present invention provides an adaptor for mounting a non-ISO 5211/DIN 3337 actuator to an ISO 5211/DIN 3337 valve.

Preferably, in a first aspect, the present invention provides a valve actuator adaptor having a body with first and second mounting surfaces, the adaptor having an aperture extending through the body, the aperture being open at each mounting surface, the first mounting surface having valve attachment points arranged around its aperture in accordance with ISO 5211/DIN 3337, the second mounting surface having valve actuator attachment points not in accordance with ISO 5211/DIN 3337, and a coupling link locatable in the aperture, a first end of the coupling link having a first surface shaped for engagement with a valve rotational control means and a second end of the coupling link having a second surface shaped for engagement with an actuator rotational drive means, the coupling link being rotatable within the aperture;

wherein the valve attachment points of first mounting surface comprise holes extending from said first mounting surface to an exposed third surface intermediate along the axial length of the adaptor, the holes being arranged to receive screws or bolts for securing the adapter to the valve, the third surface having recesses therein around said holes, the walls of the recesses being shaped to prevent rotation of the head of said screws or bolts or nuts mounted on said bolts.

Preferably, in a second aspect, the present invention provides a method of assembling a valve arrangement including the step of mounting a non-ISO 5211/DIN 3337 actuator in relation to ISO 5211/DIN 3337 valve by attachment of an adaptor between the valve and the actuator.

Preferably, in a third aspect, the present invention provides a method of modifying a valve arrangement, wherein the valve arrangement includes an ISO 5211/DIN 3337 valve which is operable via an actuator, the method including the step of mounting a non-ISO 5211/DIN 3337 actuator in relation to the valve by attachment of an adaptor between the valve and the actuator.

In another general aspect, the present invention provides the assembly comprising a valve actuator adaptor having a mounting surface with valve attachment points arranged in accordance with ISO 5211/DIN 3337, with an actuator and a valve mounted thereon.

The valve actuator attachment points are arranged around the aperture opening on the second mounting surface not in accordance with 150 5211/DIN 3337.

Preferably, the valve attachment points are valve attachment holes formed in the body of the adaptor, each valve attachment hole opening at the first mounting surface. The actuator attachment points are preferably arranged around the aperture opening at the second mounting surface. Preferably the actuator attachment points are actuator attachment holes formed in the body of the adaptor, each opening at the second mounting surface. More preferably, one of the valve attachment holes is offset from any of the actuator attachment holes. This in the sense that the principal axis of the valve attachment hole does not coincide with the principal axis of any of the actuator holes (although these axes may be parallel). Even more preferably, all of the valve attachment holes are offset from all of the actuator attachment holes. Stated in an alternative way, preferably none of the valve attachment holes is in line with any of the actuator attachment holes.

This arrangement may allow the depth of one or more of the valve attachment holes to overlap with the depth of one or more of the actuator attachment holes but wherein none of the holes, preferably, is continuous with another. Therefore, for a given hole depth, the axial length of the body of the adaptor can be shorter than if the holes were in line. This is particularly the case where each hole is open only at one end. In that case, the holes may be tapped to engage with a screw thread of an attachment screw or bolt.

One function of the adaptor is usually to allow torque to be transmitted from the actuator to the valve. Reduction in the axial length of the adaptor (as discussed above) can give rise to more efficient transmission of torque from the actuator to the valve. Typically, therefore, the actuator includes a torque transmission coupling, which is discussed is more detail below. It is usually undesirable to transmit relatively high torques over long axial torque transmission couplings since the longer the transmission coupling, the more elastic "twist" it has.

In the case where one or more of the valve or actuator attachment holes is open at both ends (for example, open at both the first mounting surface and at the second mounting surface) then the overlap (referred to above) of one hole with another can be total. As an example, for attachment of the adaptor to a valve, attachment means such as a screw, bolt or similar may be passed along the length of the valve attachment hole to the valve and tightened from the end of the hole which is not adjacent the valve, i.e. from the second mounting surface end. As will be clearly understood, another example could be of attachment of the adaptor to an actuator via an actuator attachment hole.

The valve attachment holes may be radially offset from the actuator attachment holes. Additionally or alternatively, they may be circumferentially offset from each other. Use of the words "radial" and "circumferential" imply that the adaptor has substantially circular, or at least rounded cross section, and this is preferred, but it is not essential. The adaptor could have a square, hexagonal or other polygonal cross section, for example.

With respect to the actuator attachment holes, these are preferably counterbored and preferably extend through the axial length of the body. Typically there are two actuator attachment holes, located on radially opposite sides of the body.

On the second mounting surface, there may also be located an actuator locating peg or recess, preferably a peg. This is preferably a dowel peg formed integrally with the body during, for example, die casting of the body. The location peg allows easy location of the adaptor with respect to the actuator prior to attaching the two together.

Preferably there are two (or more) locating pegs on the second mounting surface. These are typically located approximately equispaced from each other and/or the actuator attachment holes.

The actuator attachment holes may be tapped with a screw thread. However, preferably they are not, reducing the need for machining after die casting the body. This implies that attachment using the holes is via a nut and bolt arrangement, or that the valve/actuator has a tapped hole for a screw thread. The same applies to the valve attachment holes.

Preferably, a valve attachment hole extends from the first mounting surface to an outer recess formed on the body, rather than extending to the second mounting surface. This arrangement means that the adaptor may be fitted first to the actuator (by attachment through the actuator attachment holes) and then the adaptor may be connected to the valve by attachment through the valve attachment holes, by attachment means (such as a screw or bolt, etc.). The attachment means is then capable of being accessed for tightening via the outer recess in the body. In the case of a screw, the head of the screw is accessible for tightening even when the adaptor is in place between the actuator and the valve.

In a particularly preferred formation, the outer recess may be shaped so that the valve attachment hole extends through a partial flange in the body.

In use, the mode of connection of the adaptor to the valve depends to some extent on the shape of the valve. The features described are of course applicable to all aspects of the invention. In this regard "valve" is to be understood as the device, including a valve housing, in which a valve mechanism is located. In fact, the adaptor is normally attachable to a part of the valve housing. The shape of the part of the valve housing to which the adaptor is to be attached is often determined to some extent by standardization (i.e. in the present case by ISO 5211/DIN 3337). Usually, it will be in the form of a neck, open at one end, with a mounting surface shaped with attachment holes in accordance with ISO 5211/DIN 3337.

The neck may have a flange, the mounting surface being the surface of the flange. In that case, the adaptor may be attached to the flange via a bolt and nut, the arrangement being capable of being tightened from behind the flange and/or from the recess on the adaptor.

In the case where the neck of the valve does not have a flange, attachment holes may be formed extending into the neck itself, parallel to the neck axis. In that case, the attachment holes in the neck will usually be tapped to accommodate a screw (for example, a socket head cap screw) attaching the adaptor to the valve.

The ISO 5211/DIN 3337 standardization covers many different valve neck sizes and shapes. To improve the versatility of a particular adaptor according to the present invention, there may be provided one or more releasably attachable body extensions whereby one particular adaptor is attachable to more than one size or shape of valve neck. This constitutes a further, preferred feature of the first aspect of the invention.

Preferably, each releasably attachable body extension is clickwise engageable with the body of the adaptor. Preferably, such a body extension is locatable on the body at one of the body recesses described above. In place, the body extension extends radially from the body to provide a valve attachment point, preferably a valve attachment hole. In this way, an arrangement of body extensions can provide a series of valve attachment holes for the adaptor at a desired radial distance from the axis of the body. This radial distance is adjustable by using a set of body extensions of different size, and hence adjusting the location of the extended valve attachment holes. When located in place, the body extensions form a partial extended flange around the body, a surface of this partial flange located adjacent the first surface. Preferably, the extended valve attachment holes are located radially outwards but radially in line with the valve attachment holes found in the body.

Preferably, the body extensions described are moulded from plastics material.

The adaptor in use may allow an actuator to be fitted to an ISO 5211/DIN 3337 valve. It is noted that the actuator should generate torque (with respect to a valve housing). Valves of interest usually have rotational control means to open and close the valve mechanism. This is usually in the form of a valve rotational control stem which extends along the valve neck. The actuator has rotational drive means which, when the actuator is operated, rotates to rotate the rotational control means. Typically, the rotational drive means is shaped to engage with the rotational control means. In use, one or both of the rotational drive means and the rotational control means may be located in the aperture formed in the adaptor body, the adaptor serving as a sleeve around them.

However, there can be a problem either when the rotational drive means and the rotational control means are not correspondingly shaped to engage with each other, or when they do not reach far enough along the axis of the adaptor to engage with each other. In such case, the adaptor may provide a coupling link which is shaped to engage with a rotational drive means and with a rotational control means. This constitutes another general, independent aspect of the invention. In this aspect of the invention, it is not essential (although it may be preferable) that the adaptor is shaped and sized to fit to an ISO 5211/DIN 3337 valve.

The coupling link first surface may be the surface of a projection from the coupling link (a "male" connector, suitable for engagement with a "female" connector formed on the rotational control means). Preferably, the coupling link first surface is the surface of a recess formed in the coupling link (a "female" connector). Similarly, the coupling link second surface may be a male connector but is preferably a female connector. Accordingly, the fifth aspect of the invention is preferably directed towards the coupling of a "male" actuator rotational drive means with a "male" valve rotational control means. Similarly, any of the other aspects of the invention are preferably directed towards the coupling of a male actuator rotational drive means with a male valve rotational control means.

Preferably, the coupling link is a hollow or partially hollow cylinder, the internal surface of the cylinder incorporating the first and second surfaces.

Suitable shapes for the valve rotational control means and/or the actuator rotational drive means are known in the art, for example parallel square, diagonal square, flat head or keyway. It is to be understood that the invention is applicable to all of these shapes.

The coupling link may be separable into two parts, each having a section which is correspondingly shaped which are engageable together by engagement of the correspondingly shaped sections. In that case, the first and second surfaces typically are each located on a different part.

The corresponding shape of the sections of the two separable parts is preferably polygonal in cross section. The shape may, for example, be triangular, rectangular, square, hexagonal. It may also be star-shaped, for example. If star shaped, preferably the star has 8 points or more Even more preferably, the corresponding shape may be serrated (i.e. a many-pointed star). Most preferably, the shape is finely serrated, for example with 20 or more, 36 or more or 48 or more serrations.

Typically, one of the parts is an insert being insertable into the other part for engagement. In that case, the insert has an outer surface which is correspondingly shaped for engagement with a correspondingly shaped opening in the other part.

Typically, one of the separable parts is replaceable by another. In this way, a coupling link may be provided which, on changing one of the parts, is shaped for engagement with a different rotational drive or control means.

Preferably, the replaceable part of the coupling link is an insert, preferably with a serrated outer surface, the internal surface of the insert preferably being the first surface of the coupling link. That is, it is preferably the insert which engages with the valve rotational control means.

The use of serrations has various advantages over shapes with fewer edges. Firstly, the serrations provide good use of radial space for a given torque transmission. Secondly, the serrations provide lower backlash because of larger diameter of connecting surface. Thirdly, the serrations provide lower local stress because the torque is resisted by a larger number of positions. Furthermore, the insert can be positioned in many different orientations with respect to the remainder of the coupling to suit applications and makes it unnecessary to be precise in the orientation of the insert. Still further, the preferred feature allows easier production of the inserts because of only a small amount having to be removed per tooth.

In another aspect, the present invention provides a valve actuator adaptor according to the fourth aspect or the fifth aspect, with any of the features (including preferred features) described with respect to the fifth aspect or the fourth aspect, respectively.

In a further aspect, the present invention provides a valve actuator arrangement including an adaptor according to either the fourth or the fifth aspect and a non-ISO 5211/DIN 3337 actuator, the adaptor being attachable to the actuator at the second mounting surface of the adaptor.

In another aspect, the present invention provides a valve arrangement including an adaptor according to either the fourth or the fifth aspect and an ISO 5211/DIN 3337 valve, the adaptor being attachable to the valve at the first mounting surface of the adaptor.

BRIEF DESCRIPTION OF THE DRAWINGS

Preferred embodiments of the invention will now be described, by way of example only, with respect to the accompanying drawings, in which:

FIG. 8 shows an end view of an adaptor-actuator arrangement including an adaptor according to another embodiment of the invention;

FIG. 9 is a side view, partial insection, of the adaptor/actuator arrangement of FIG. 8;

FIG. 10 is a partial sectional view along the line C—C in FIG. 8; and

FIG. 11 is a perspective view of the adaptor/actuator arrangement of FIG. 8.

The drawings are adapted from engineering drawings. On the drawings, some solid and broken guide lines are shown, as well as some intersecting orthogonal lines which indicate the centre of a hole, object, part of an object or other feature with some circular symmetry. These will be readily understood by the skilled person.

DETAILED DESCRIPTION

Figure 1:
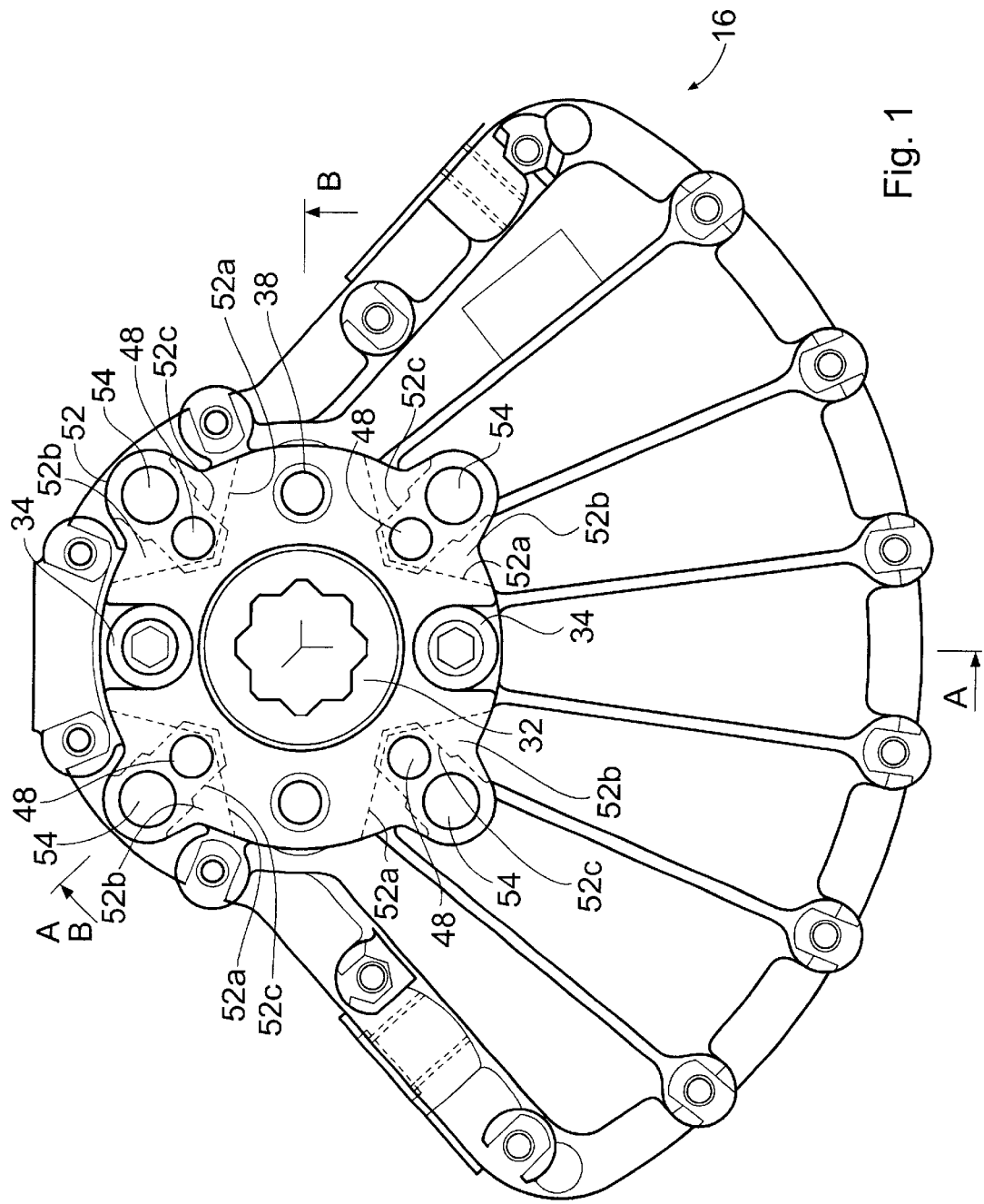
FIG. 1 shows a schematic partial axial sectional view of a valve-adaptor-actuator arrangement including an adaptor according to an embodiment of the invention.
Figure 2:
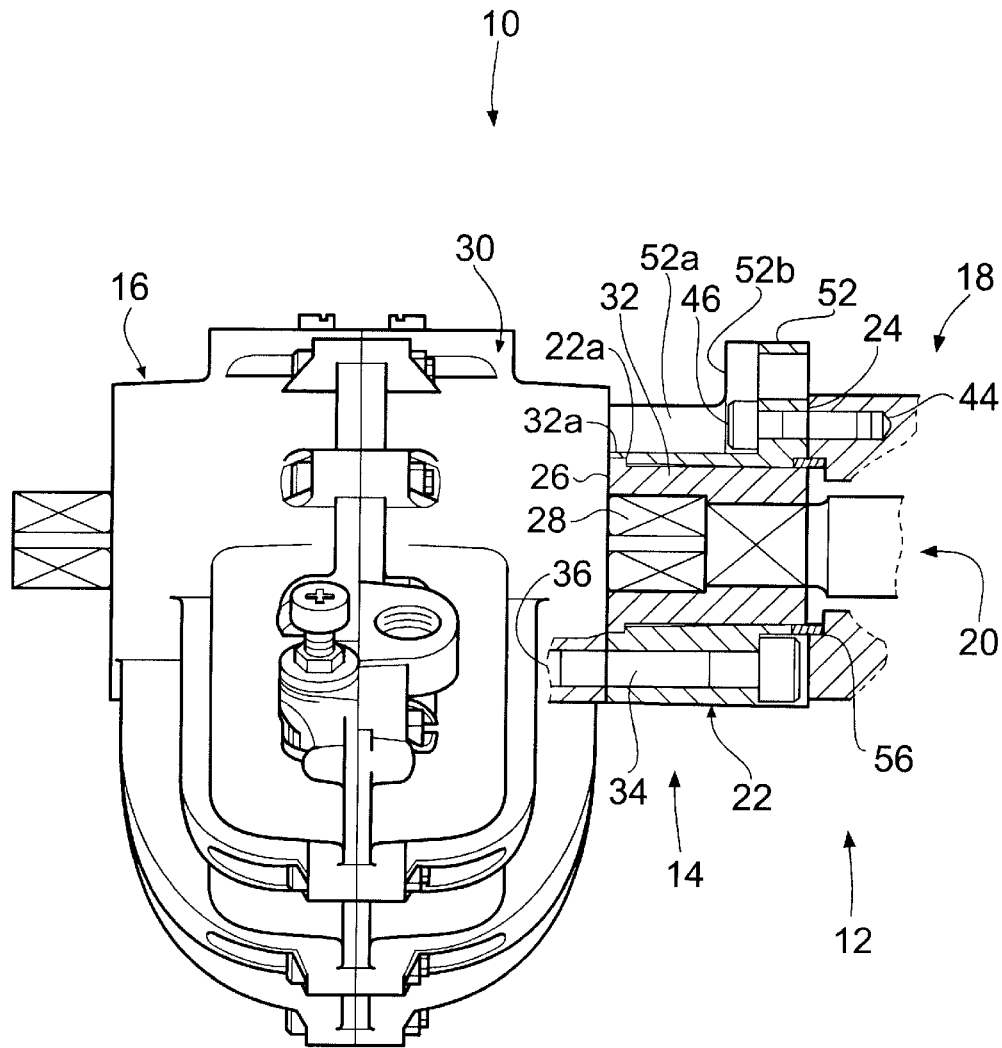
FIG. 2 shows a sectional view along line AA of FIG. 1 with a first valve attachment scheme.

FIG. 1 shows a schematic partial axial sectional view of a valve-adaptor-actuator arrangement. The structure is perhaps more easily discernible from FIG. 2, which shows a partial sectional view along line AA in FIG. 1. In FIG. 2, the arrangement 10 includes a valve 12, an adaptor 14 and an actuator 16.

FIG. 2 shows part of the neck 18 of the valve. The neck is part of the valve housing which houses the valve mechanism. The neck extends generally cylindrically from the valve mechanism (not shown). A valve rotational control stem 20 extends substantially along the principal axis of the valve neck 18. The rotational control stem 20 is attached to the valve mechanism in such a way that rotation of the control stem about its principal axis either opens or closes the valve mechanism, depending on the direction of rotation. The principal axis of the control stem 20 coincides with the principal axis of the neck 18. Usually, clockwise rotation (this direction being viewed from along the principal axis of the control stem 20 towards the valve mechanism) closes the valve mechanism.

The valve neck 18 extends from the valve mechanism (not shown) to a flat or substantially flat mounting surface formed generally perpendicular to the principal axis of the valve neck 18. In this embodiment, the rotational control stem 20 extends beyond this mounting surface so that it projects beyond the end of the valve neck 18.

The actuator 16 is attached to the valve 12 by way of an adaptor 14. The adaptor 14 has a body 22 with a substantially cylindrical aperture formed through it. The adaptor 14 has two mounting surfaces. The first mounting surface 24 is typically a flat end surface of the body, substantially perpendicular to the principal axis of the cylindrical aperture of the body 22. In use, the first mounting surface is mounted adjacent the neck 18 of the valve 12.

The second mounting surface 26 of the adaptor 14 is located at an opposite end of the body 22 to the first mounting surface 24, and is substantially flat and parallel with the first mounting surface 24. In use, the actuator 16 is attached to the adaptor 14 at the second mounting surface 26.

The role of the adaptor is at least two-fold. Firstly, it must be suitable for attachment both to an actuator and to a valve. Thus, typically, its first and second mounting surfaces are not identical (since otherwise the actuator and valve would be suitable for direct attachment to each other). The mounting surfaces of the adaptor may, for example, be of different size and may have different attachment points or holes located in the attachment surface. Secondly, the adaptor 14 must provide a way to transmit torque from the actuator 16 to the valve rotational control stem 20.

Looking at the transmission of torque from the actuator 16 to the valve rotational control stem 20, the present embodiment describes the use of a "male" actuator 16 and "male" valve stem 20. In this arrangement, the male part of the actuator is the drive shaft 28 which projects from the actuator housing 30. In this embodiment, the actuator drive shaft 28 and the valve rotational control stem 20 are not directly engageable with each other, since they both require "female" engagement.

For this reason, the embodiment described includes a coupling link 32. The coupling link 32 is generally cylindrical in shape and sized to fit and rotate within the cylindrical aperture formed in the body 22. The coupling link 32 has female engagement portions located at each end. The first female engagement portion is shaped to fit around a part of the valve rotational control stem 20. The second female engagement portion is shaped to fit around a part of the actuator drive shaft 28. In use, the actuator drive shaft 28 rotates and this rotation is transferred to the valve rotational control stem 20 via the coupling link 32.

Typically, the coupling link 32 is axially as short as possible. As shown in FIG. 2, a consequence of this is that the actuator drive shaft 28 and the valve rotational control stem 20 abut or very nearly abut near the centre of the coupling link 32. The short axial length of the coupling link 32 leads to efficient torque transmission.

In one embodiment, the actuator drive shaft has a square cross section perpendicular to its axis of rotation, and the valve rotational control stem also has a square cross section perpendicular to its axis of rotation. In this embodiment, the coupling link is correspondingly shaped to receive parts 28 and 20 with a relatively tight fit.

The above embodiment has been described with respect to a valve rotational control stem which is square. Of course, with reference to the text of ISO 5211, square valve stems may be parallel or diagonal square. Furthermore, the valve stem may be of single or multiple key type or of flat head type.

In use, the adaptor 14 is attached to the actuator 16 before attachment to the valve 12. In this embodiment, attachment of the adaptor 14 to the actuator 16 is achieved by two screws 34 (only one of which is shown in FIG. 2 due to the direction of the line AA). The screw 34 fits along an actuator attachment hole formed in the body 22, parallel to the principal axis of the body 22, the attachment hole being open at both the first mounting surface and the second mounting surface of the body 22. The screw 34 fits into the tapped hole 36 in the actuator 16 and may be tightened into the hole 36 by conventional means such as a screwdriver, hexagonal or other drive means which is engageable with the head of the screw 34. The holes 34 are disposed on circumferentially opposite sides of the body, as shown in FIG. 1.

In order to facilitate location of the adaptor 14 with respect to the actuator 16 prior to attachment, the adaptor body 22 has pegs 38 protruding from the second mounting surface of the body 22. Typically, these pegs 38 are diecast dowel pegs. In this embodiment, there are two pegs 38 disposed on opposite sides of the body 22, as shown in FIG. 1. Here they are located equispaced from the attachment holes within which the screws 34 are fitted. In use they locate within location holes 40 provided within the actuator 16.

Once the adaptor body 22 has been fitted to the actuator 16 by tightening of the screws 34, the coupling link 32 can be slid into the cylindrical aperture of the body to engage with the actuator drive shaft 28. Alternatively, the coupling link 32 can be engaged with the actuator drive shaft 28 first and the adaptor body 22 fitted over the coupling link 32.

The arrangement of holes and pegs on the second mounting surface of the adaptor 14 clearly depends upon the arrangement of available mounting holes on the actuator 16. In the present embodiments, the actuator is preferably a Kinetrol actuator.

The shape of the valve neck 18 is determined by standardization. The relevant standards, as mentioned above, are ISO 5211 and DIN 3337. These standardization documents define various shapes for the valve neck 18. The valve neck 18 may be straight, as shown in FIG. 2 or it may have a valve neck flange 42, as shown in the alternative arrangement of FIG. 3.

Looking first at FIG. 2, where there is a valve with a flangeless neck, the neck 18 has attachment holes 44 formed in the neck, extending from the mounting surface formed on the neck parallel to the principal axis of the neck. In the case of FIG. 2, the hole 44 is tapped to engage with a screw thread of the screw 46 which is passed through the hole 48 in the body 22. The holes 48 are shown more clearly in FIG. 1. The holes 48 are open at both ends, and extend from the first mounting surface of the body 22. However, they do not extend to the full length of the body 22 to open at the second mounting surface. Instead, they open into a recess formed at the exterior of the body 22. The reason for this is that it is necessary to be able to tighten the screw 46 into the tapped hole 44 in the valve neck and so the head of the screw 46 must be accessible to a screwdriver or other drive means even when the adaptor 14 is mounted on the actuator 16. Typically, the recess described above is partially cylindrical in shape to accommodate a drive means to tighten the screw 46.

The arrangement of holes in the valve neck 18 is governed by the standards mentioned above. For small valve sizes, adjacent holes 44 (and hence holes 48) are around 90 degrees apart. For larger valve sizes this angle decreases to, say, 9 degrees for large valve sizes. More information on this point is contained in the standardization texts referred to above.

Figure 3:
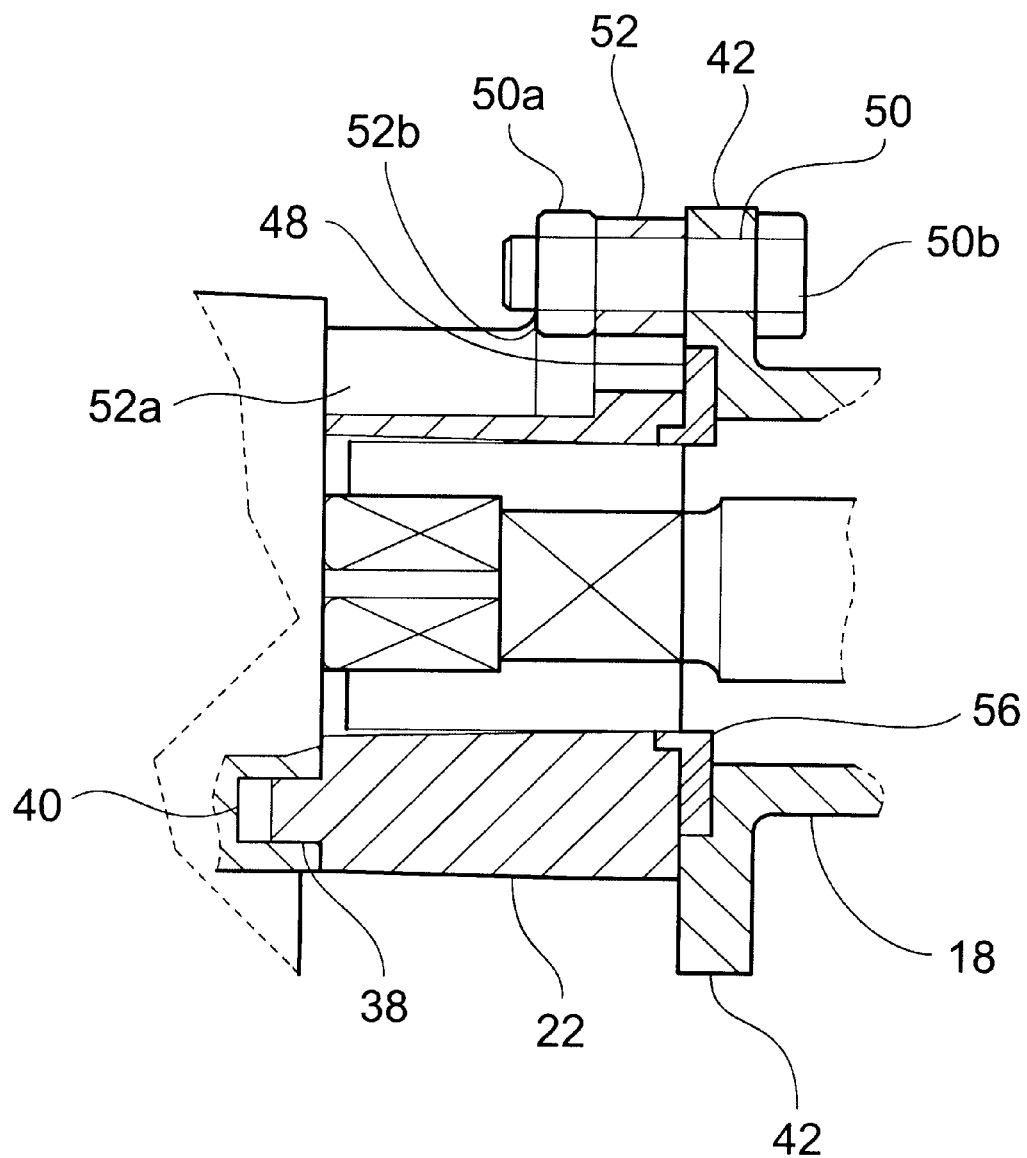
FIG. 3 shows a partial sectional view (not including the actuator) along line BB in FIG. 1 with a different valve attachment scheme to that shown in FIG. 2.

Some valves have necks with a flange 42, as shown in FIG. 3. Again, the flange sizes are determined according to ISO 5211 and DIN 3337. It is of course possible to have a hole which extends through the thickness of the flange 42. This was not possible with a hole 44 extending into the valve neck for a flangeless neck. Therefore this embodiment provides an alternative means of attachment of the adaptor 14 to the valve neck 18. The hole 50 formed in the valve flange 42 may be tapped with a screw thread. In that case, attachment of the adaptor to the valve neck 18 may be by a screw. Alternatively, as shown in FIG. 3 attachment may be by nut 50a and bolt 50b which can be arranged to be tightened at either end of the bolt.

Of course, as shown in FIG. 3, the holes 48 may not be located in a suitable position for use to connect the adaptor 14 to a valve neck with a flange 42. This is because, for a particular size of valve, the attachment holes on the valve neck 42 will generally be radially displaced with respect to the bulk of valve neck 18. Therefore another embodiment of the invention provides additional attachment parts 52. These parts 52 form an extra, partial attachment flange around the body 22. Each part 52 has an attachment hole 54 formed in it, and these define a ring of attachment holes 54, the ring having a greater radius than the ring of attachment holes 48. Thus, by suitable sizing and shaping of the parts 52 an adaptor body 22 can be made to fit with a valve neck of more than one size. A limit on this is of course the limit of strength of the extension parts 52.

FIGS. 2 and 3 also show that the holes 48, 54 are accessible from the actuator side due to the parts 52 forming partial flanges, and also due to recesses 52a formed in the body of the adaptor which expose the holes 48. The result, as can be seen from FIG. 2, is that the partial flange and the surface of the recesses 52a facing the actuator form an exposed surface 52b to which the holes 48, 52 extend from the first mounting surface. FIG. 1 also shows that the exposed surface 52b has a recess 52c therein, formed at the ends of the holes 48, 54, which recess is shaped to receive the hexagonal ends of the screws 46 or the nuts 50a, to prevent them rotating.

As shown in FIGS. 2 and 3, there is also included a flange locater 56 which, in both embodiments, helps to locate the valve neck with respect to the adaptor body 22. The flange locater 56 is ring-shaped and is received within a ring-shaped recess formed in the adapter body 22 and in a correspondingly shaped recess in the valve neck 18 or the valve flange 42.

In use, the adaptor 14 contains spaces where any leakage through the valve stem is easily relieved.

FIG. 2 also shows that the coupling link 32 is retained in the body 22 by a flange 32a on the coupling link 32 which engages a recess 22a in the body 22 The step in the body formed by that recess 22a acts to prevent axial movement of the coupling 32 and so prevents that coupling falling out of the actuator 14 during transport in some use situations.

Figure 4:
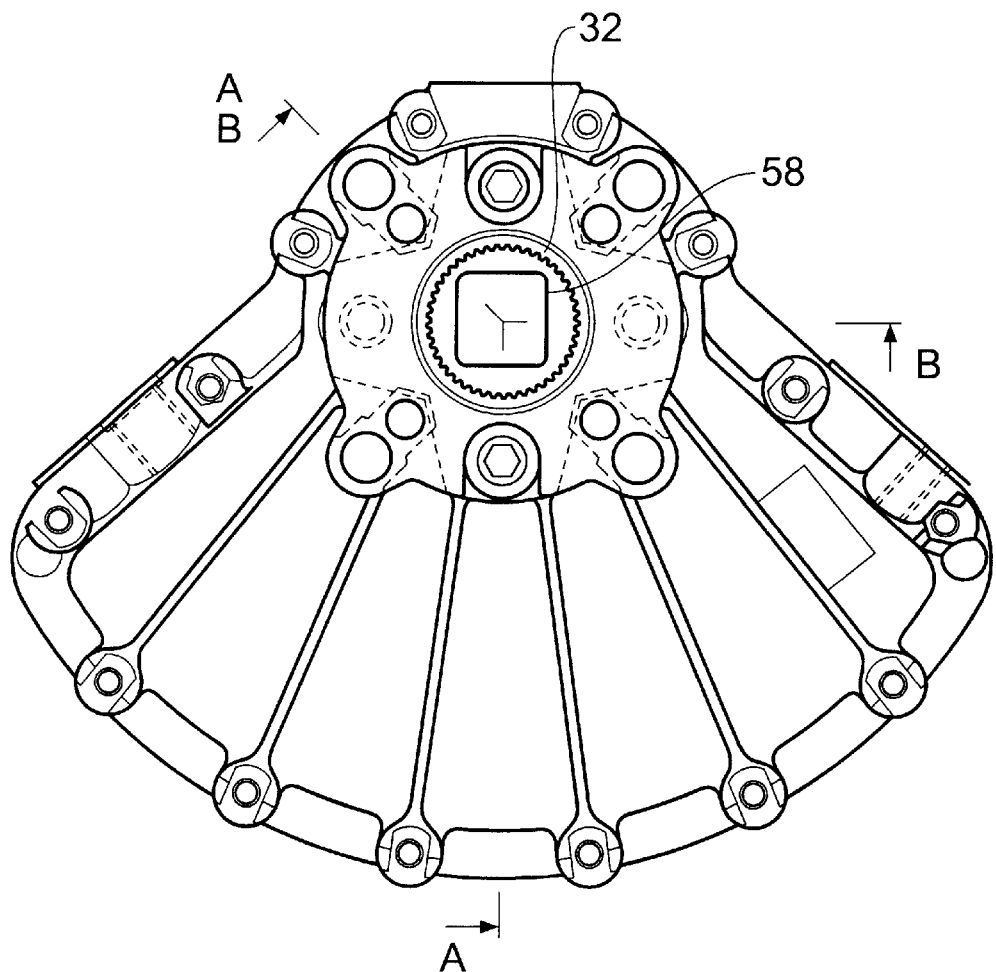
FIG. 4 shows a schematic partial axial sectional view of a valve-adaptor-actuator arrangement including an adaptor according to another embodiment of the invention.
Figure 5:
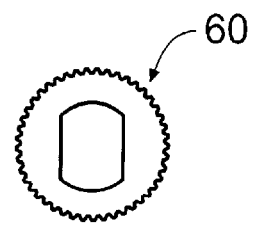
FIG. 5 shows an alternate insert to that shown in FIG. 4.

In the embodiments described above, the coupling link 32 fits directly with the actuator drive shaft 28 and with the valve rotational controls stem 20. In another embodiment, there is provided an insert into the coupling link 32 which can provide the adaptor 14 with extra applicability to differently shaped valve control stems 20. This is shown in FIG. 4 which is similar to FIG. 1 except that there is shown an insert 58 within the coupling link 32. In FIG. 4, the insert has a square female engagement portion, typically a square hole extending through the length of the insert 58. However, as shown in FIG. 5, this insert could be replaced with a flat head female drive 60, to be used in the case where the valve rotational control stem 20 is a flat head male shape.

Figure 6:
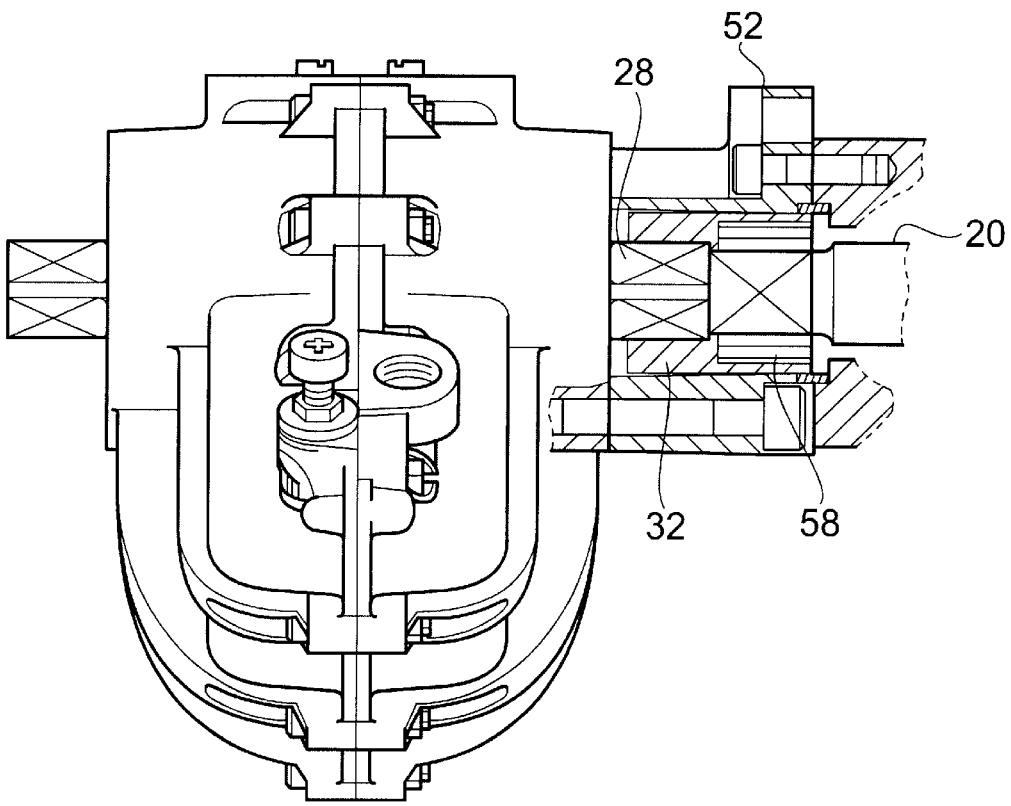
FIG. 6 shows a partial sectional view along line AA in FIG. 4 with a first valve attachment scheme.
Figure 7:
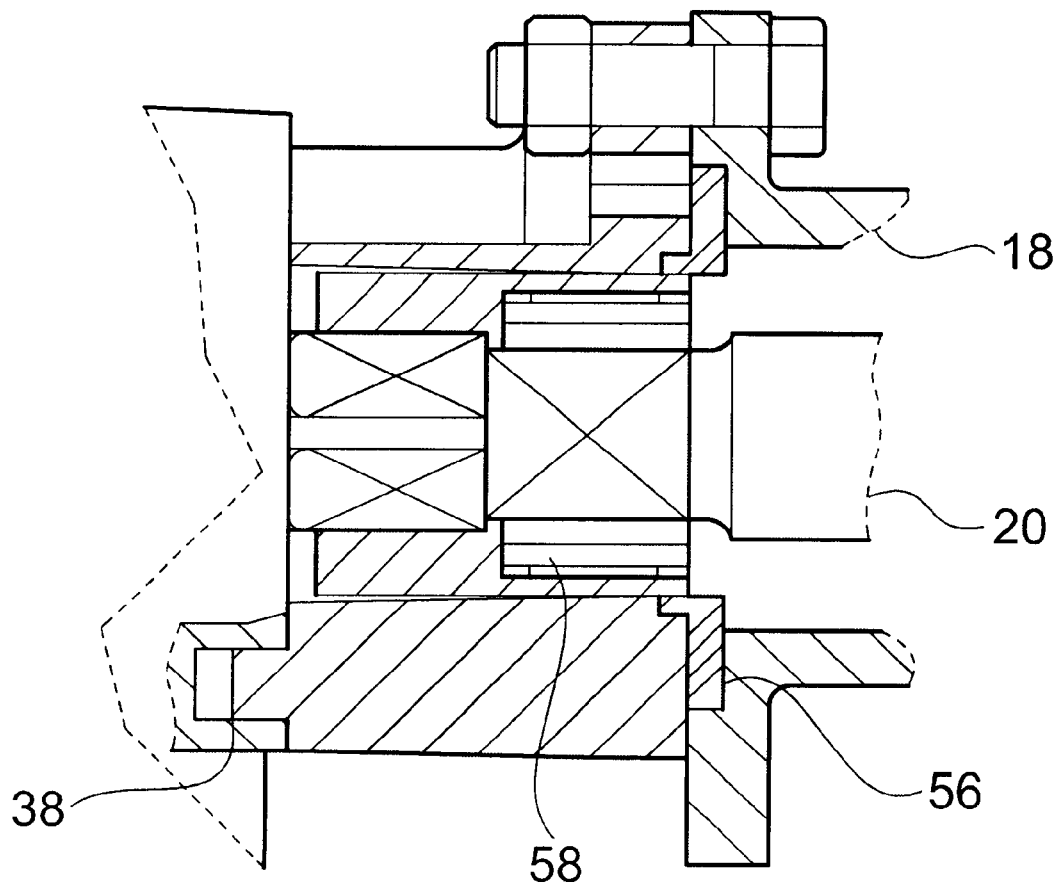
FIG. 7 shows a partial sectional view (not including the actuator) along line BB in FIG. 4 with a different valve attachment scheme to that shown in FIG. 6.

The insert arrangement is shown more clearly in FIG. 6. The insert 58 is held within and is coaxial with the coupling link 32 and provides the female engagement with valve rotational control stem 20. Using this arrangement, a particular adaptor may be used with valves having different shapes of control stems, by changing the shape of the insert female engagement portion.

Of course, the insert 58 must engage with the coupling link 32. In FIG. 4, the insert 58 is shown having a serrated external surface. These serrations extend axially along the outer length of the insert 58. The coupling link 32 has a correspondingly shaped internal serrated surface to form a snug, axially slidable fit with the insert 58. Typically, the serrations formed on the outer surface of the insert 58 are fine serrations. The advantage of using fine serrations is that the insert can be removed from the coupling link 32 and turned through only a small angle before it will fit again, in this new orientation, into the coupling link 32. This is advantageous if it is necessary to make fine adjustments to the orientation of the female engagement portion (i.e. the hole in the centre of the insert 58) with respect to the control stem 20 of the valve. It will be clear to the skilled person that the fewer serrations which the insert has, the larger the circumferential angle between adjacent serrations, and hence the larger the discrete smallest angle of adjustment of the insert with respect to the coupling link possible.

Furthermore, the use of fine serrations is advantageous because only a small amount of material needs to be removed from the insert 58 per tooth, easing the degree of machining necessary. The same applies to the machining of serrations into the coupling link 32. Furthermore, the use of fine serrations allows efficient use of radial space in the coupling link 32 for a given torque transmission. There is lower backlash because of the larger diameter of connecting surface and also lower local stress because the torque is resisted by a larger number of positions than if a rough serration or other, lower polygonal shaped interface is used.

A further embodiment of this invention is illustrated in FIGS. 8 to 11. This embodiment is generally similar to the embodiment of FIGS. 1 to 3, and corresponding parts are indicated by the same reference numerals. The embodiment of FIGS. 8 to 11 differs from the embodiment of FIG. 1 primarily in that the adaptor 14 is differently shaped. In particular, the shape of the mounting surface 24 is different. In addition, there is a ring 60 at the end of the actuator 16 remote from the adaptor 14. These differences will now be described in detail. The other parts of the embodiment of FIGS. 9 to 11 will not be described in detail, since they are the same as the earlier embodiments, to avoid duplication of description.

In the embodiment of FIGS. 8 to 10, the first coupling surface 24 is defined by a lower flange 64, the periphery of which has four projections 65, giving the flange 64 a somewhat star-like appearance. Each projection 65 has a plurality of fixing holes therein, some of which may overlap. Thus, there are fixing holes 67 which are discrete, but there are also slots 69 which define two overlapping fixing holes. It has been found that the holes defining slots 69 have sufficient side walls to maintain a hexagon nut on either hole centre, and yet to prevent that nut rotating. Thus, by having such partially overlapping holes, a greater range of possibilities for fixing of the flange 64 to an appropriate valve can be achieved.

As is evident from FIGS. 9 and 10, the coupling link 32 has a flange 32a thereon which engages with recess 22a in the body 22 of the actuator, to prevent the coupling link falling out during transport or use. This feature was also discussed with reference to FIG. 2.

In addition, as previously mentioned, there is a ring 60 on the actuator shaft.

FIG. 8 also shows grooves 80 which are formed in the first mounting surface 24 which allows for leakage between the valve and adapter to escape. Those grooves extend from the coupling link to the outer periphery of the body of the adaptor.

Thus, the embodiments described describe an actuator-valve adaptor which can be designed to adapt a particular actuator to a particular valve. However, the embodiments also show how a particular adaptor can be modified so that it can be connected to more than one size and shape of valve, including size and shape of a valve stem.

It will be clear to the skilled person that the invention is not limited to the embodiments described above. Modifications of these embodiments, further embodiments and modifications thereof will be apparent to the skilled person. In particular, it will be clear that the invention is not limited to an adaptor which connects a male actuator to a male valve. For example, the above embodiments could be modified so that the coupling link 32 has one or more male engagement portions which engage with a female drive member of the actuator and/or with a female control stem of the valve.

What is claimed is:

1. A method of assembling a valve assembly comprising mounting an adapter onto an ISO 5211/DIN 3337 valve and mounting a non ISO 5211/DIN 3337 actuator on the adapter, wherein the adapter comprises:
a body with first and second mounting surfaces, the adaptor having an aperture extending through the body, the aperture being open at each mounting surface, the first mounting surface having valve attachment points arranged around its aperture in accordance with ISO 5211/DIN 3337, the second mounting surface having valve actuator attachment points not in accordance with ISO 5211/DIN 3337, and a coupling link locatable in the aperture, a first end of the coupling link having a first surface shaped for engagement with a valve rotational control means and a second end of the coupling link having a second surface shaped for engagement with an actuator rotational drive means, the coupling link being rotatable within the aperture;
wherein the valve attachment points of first mounting surface comprise holes extending from said first mounting surface to an exposed third surface intermediate along the axial length of the adaptor, the holes being arranged to receive screws or bolts for securing the adapter to the valve, the third surface having recesses therein around said holes, the walls of the recesses being shaped to prevent rotation of the head of said screws or bolts or nuts mounted on said bolts.

2. A method of assembling a valve assembly comprising mounting an adapter onto a non IS 5211/DIN 3337 actuator, and mounting the adapter onto an ISO 5211/DIN 3337 valve, wherein the adapter comprises:
a body with first and second mounting surfaces, the adaptor having an aperture extending through the body, the aperture being open at each mounting surface, the first mounting surface having valve attachment points arranged around its aperture in accordance with ISO 5211/DIN 3337, the second mounting surface having valve actuator attachment points not in accordance with ISO 5211/DIN 3337, and a coupling link locatable in the aperture, a first end of the coupling link having a first surface shaped for engagement with a valve rotational control means and a second end of the coupling link having a second surface shaped for engagement with an actuator rotational drive means, the coupling link being rotatable within the aperture;
wherein the valve attachment points of first mounting surface comprise holes extending from said first mounting surface to an exposed third surface intermediate along the axial length of the adaptor, the holes being arranged to receive screws or bolts for securing the adapter to the valve, the third surface having recesses therein around said holes, the walls of the recesses being shaped to prevent rotation of the head of said screws or bolts or nuts mounted on said bolts.

3. A valve actuator adaptor having a body with first and second mounting surfaces, the adaptor having an aperture extending through the body, the aperture being open at each mounting surface, the first mounting surface having valve attachment points arranged around its aperture in accordance with ISO 5211/DIN 3337, the second mounting surface having valve actuator attachment points not in accordance with ISO 5211/DIN 3337, and a coupling link locatable in the aperture, a first end of the coupling link having a first surface shaped for engagement with a valve rotational control means and a second end of the coupling link having a second surface shaped for engagement with an actuator rotational drive means, the coupling link being rotatable within the aperture;
wherein the valve attachment points of first mounting surface comprise holes extending from said first mounting surface to an exposed third surface intermediate along the axial length of the adaptor, the holes being arranged to receive screws or bolts for securing the adapter to the valve, the third surface having recesses therein around said holes, the walls of the recesses being shaped to prevent rotation of the head of said screws or bolts or nuts mounted on said bolts.

4. An adaptor according to claim 3, wherein an actuator locating peg or recess is located on the second mounting surface.

5. An adaptor according to claim 3, wherein the actuator attachment points are arranged around the aperture opening on the second mounting surface, the valve attachment points are arranged around the aperture opening at the first mounting surface and at least one of the valve attachment points is offset from any of the actuator attachment points.

6. An adaptor according to claim 5, wherein the valve attachment points are angularly offset from the actuator attachment points.

7. An adaptor according to claim 3 wherein the third surface is defined by an outer recess on the body, and the valve attachment hole extends from the first mounting surface to the outer recess.

8. An adaptor according to claim 3, wherein the first surface of the coupling link is the surface of a recess in the coupling link.

9. An adaptor according to claim 3, wherein the second surface of the coupling link is the surface of a recess in the coupling link.

10. An adaptor according to claim 3, wherein said coupling link and said body have an interlocking flange and groove for retaining said coupling link in said body.

11. An adaptor according to claim 10, wherein the flange is on the coupling link.

12. An adaptor according to claim 3, wherein there are slots in said first surface extending from said aperture to the radial periphery of said body.

13. An assembly comprising:

i) an adaptor, the adapter comprising:

a body with first and second mounting surfaces, the adaptor having an aperture extending through the body, the aperture being open at each mounting surface, the first mounting surface having valve attachment points arranged around its aperture in accordance with ISO 5211/DIN 3337, the second mounting surface having valve actuator attachment points not in accordance with ISO 5211/DIN 3337, and a coupling link locatable in the aperture, a first end of the coupling link having a first surface shaped for engagement with a valve rotational control means and a second end of the coupling link having a second surface shaped for engagement with an actuator rotational drive means, the coupling link being rotatable within the aperture;

wherein the valve attachment points of first mounting surface comprise holes extending from said first mounting surface to an exposed third surface intermediate along the axial length of the adaptor, the holes being arranged to receive screws or bolts for securing the adapter to the valve, the third surface having recesses therein around said holes, the walls of the recesses being shaped to prevent rotation of the head of said screws or bolts or nuts mounted on said bolts;

ii) a valve secured to the first mounting surface and iii) an actuator secured to the second mounting surface.

14. An assembly according to claim 13, wherein screws pass through said holes and engage with threaded holes in the valve.

15. An assembly according to claim 13, wherein the valve has a flange with flange holes therethrough, and screws or bolts pass through said holes and said flange holes.

\* \* \* \* \*